Jan. 15, 1946.　　　　C. A. HOLMAN　　　　2,392,921
ENGINE
Filed April 10, 1943　　　　3 Sheets-Sheet 1

INVENTOR
CHARLES A. HOLMAN
BY
Cook & Robinson
ATTORNEY

Jan. 15, 1946. C. A. HOLMAN 2,392,921
ENGINE
Filed April 10, 1943 3 Sheets-Sheet 2
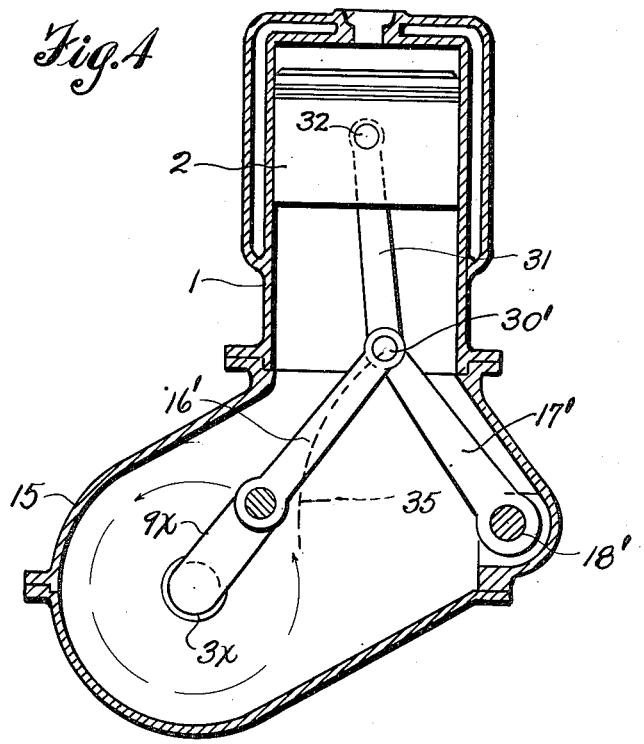
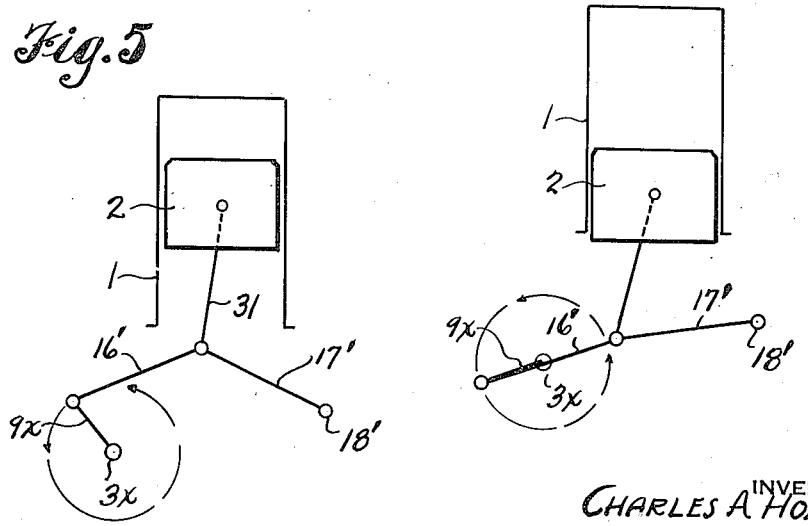
INVENTOR
CHARLES A. HOLMAN
BY
Cook & Robinson
ATTORNEY Jan. 15, 1946.  C. A. HOLMAN  2,392,921
ENGINE
Filed April 10, 1943  3 Sheets-Sheet 3

INVENTOR
CHARLES A. HOLMAN
BY
Cook & Robinson
ATTORNEY

Patented Jan. 15, 1946

2,392,921

UNITED STATES PATENT OFFICE 2,392,921

ENGINE

Charles A. Holman, Seattle, Wash.

Application April 10, 1943, Serial No. 482,580

1 Claim. (Cl. 74—44)

This invention relates to engines, and has reference more particularly to improve means in engines, or prime movers, for the transmission of power impulses of a reciprocatory, driving member to a rotary, driven member, such, for example, as a means for the connecting of a piston of an internal combustion engine with a crank shaft; it being the principal object of this invention to provide an improved form of driving connection between the piston of an engine and the crankshaft of the engine whereby to give increased power output and efficiency of the engine without increase in fuel consumption.

It is also an object of the invention to provide a practical driving connection that may be adapted to the conventional types of internal combustion engines as now generally applied to automobiles, boats and the like, whereby vibration from engine operation is lessened, and whereby wear on the pistons and cylinder walls, such as results from lateral thrust of the connecting rod as applied in the ordinary types of engines, is reduced to a minimum.

More specifically stated, the objects of the present invention reside in the provision of an internal combustion engine wherein the driving connection between the piston and crank shaft is effected through the mediacy of a novel toggle linkage that provides for an extended application of power to the crank shaft through that part of the power stroke of the piston that is usually the least effective due to the angular relationship of the piston connecting rod and radial arm of the crank shaft to which it is connected.

Still further objects of the invention reside in the arrangement of the present toggle linkage relative to the direction of travel of the piston in its power stroke and location of the crank shaft whereby the power impulses of the piston are more effectively applied to the crank shaft and whereby the reaction forces of explosions in the cylinder against the piston are applied in lines parallel to or substantially parallel to the axial line of travel of the piston.

It is also an object of this invention to so time the application of power impulses against the piston that the power increase through the use of the present toggle linkage is most effective throughout the full length of the power stroke.

Still further objects of the invention reside in the details of construction, in the combination of parts and the mode of operation of the engine, using the present connection in its various modifications, as will hereinafter be fully described.

In accomplishing these and other objects of the invention, I have provided the improved details of construction, the preferred forms of which are illustrated in the accompanying drawings, wherein—

Fig. 1 is a cross sectional view of an engine having a driving connection between the piston and power take-off shaft made in accordance with details of the present invention and its objects.

Figs. 2 and 3, respectively, diagrammatically illustrate the position of the parts embodied in the driving connection at the end and at the start of a power stroke of the piston.

Fig. 4 is a cross sectional view of an internal combustion engine made according to objects of this invention and showing a driving connection of an alternative form between the piston and crankshaft.

Figs. 5 and 6 are views diagrammatically illustrating, respectively, the position of the toggle linkage during and at the end of a power stroke of the piston in the engine of Fig. 4.

Figure 7:
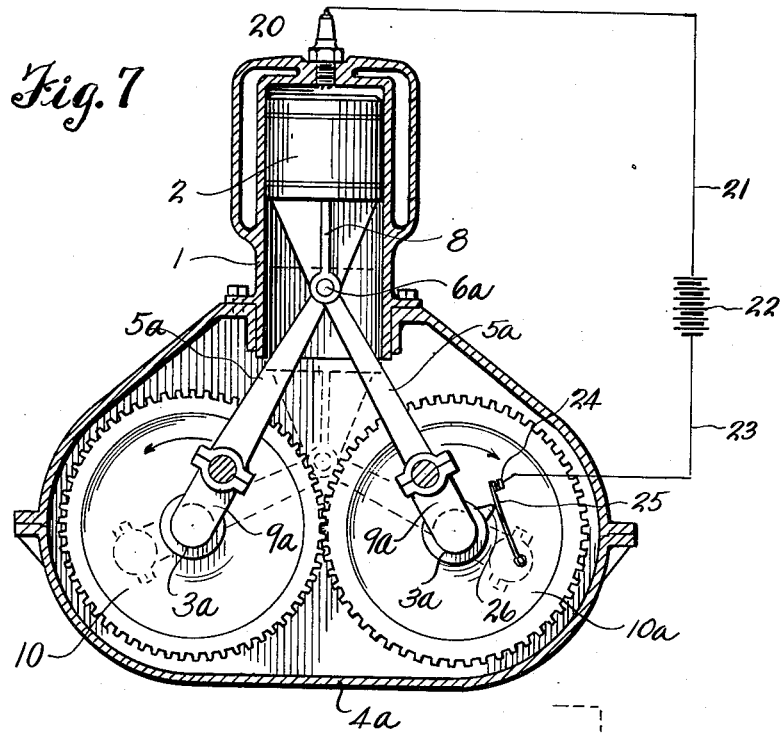
Fig. 7 is a sectional view of an engine equipped with another alternative form of connection between the power piston and power take-off shaft.
Figure 8:
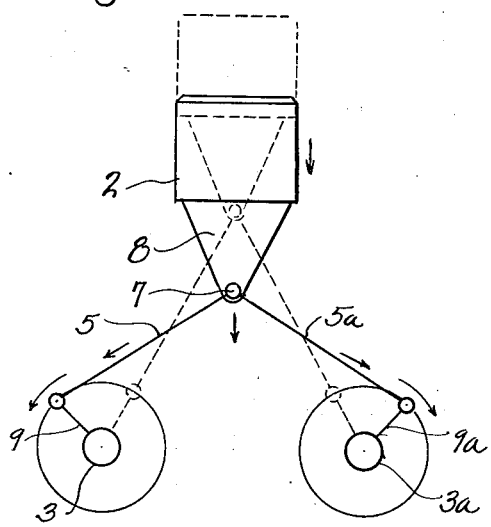
Figure 9:
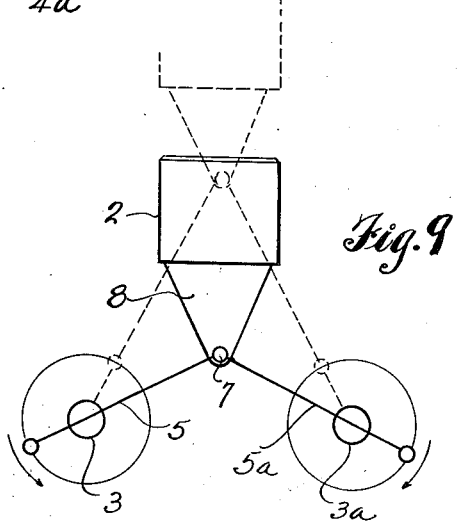

Figs. 8 and 9, respectively, diagrammatically illustrate position of parts during and at the end of a power stroke of the piston in the engine of Fig. 7.

Referring more in detail to the drawings—

Figure 1:
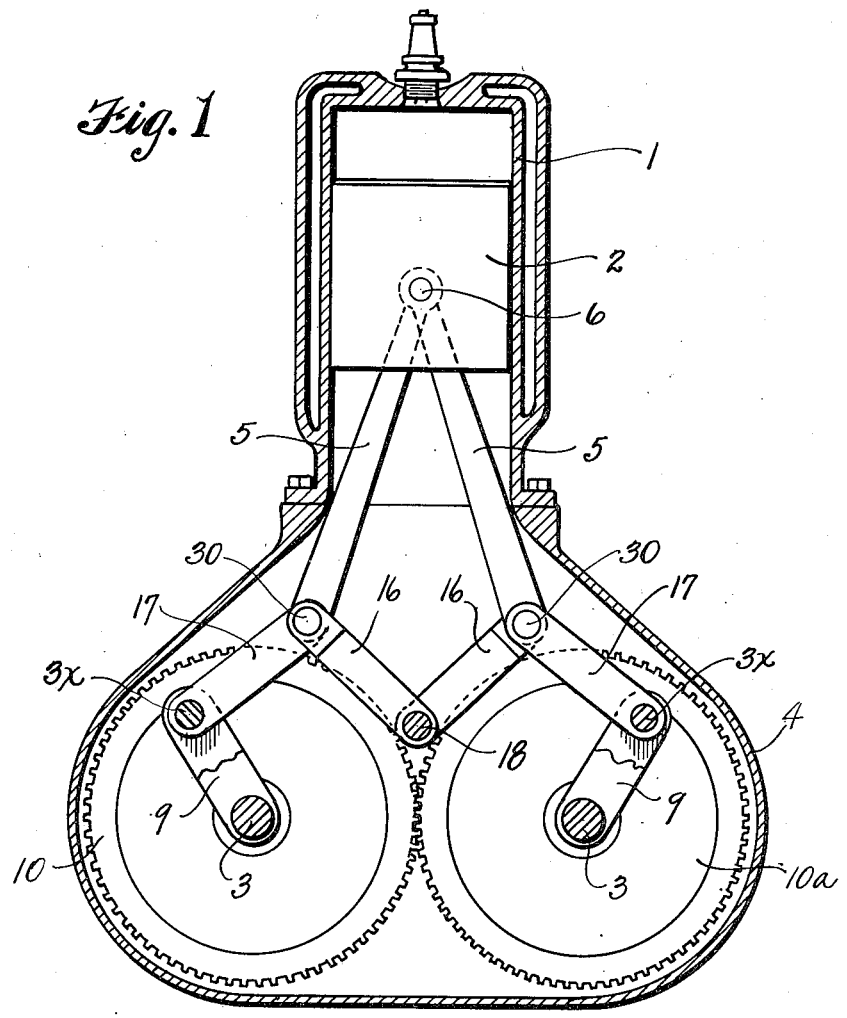

In Fig. 1, I have illustrated a type of reciprocating engine, such as might be operated by the exploding of gaseous fuel charges in the closed end of a power cylinder to act directly against a piston. In this engine, power impulses are applied only against the top end of the piston, to drive it downwardly, and it is returned by the connections shown, to its starting position, or top of the piston stroke.

Figure 2:
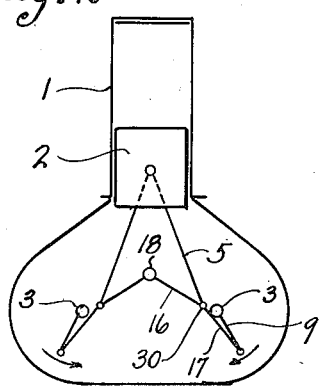
Figure 3:
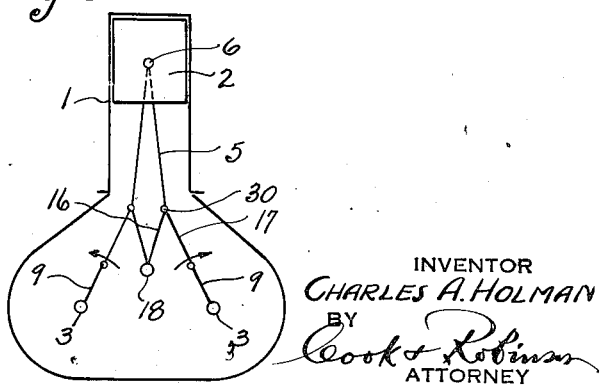

In Figs. 1, 2 and 3, I designates the engine cylinder, 2 a piston that is reciprocally operable in the cylinder, and 3 and 3 designate crank shafts mounted in the engine crank case or housing 4 in spaced parallel relationship and symmetrically located at opposite side of the axial line of the cylinder and somewhat below the limit of downward travel of the piston. The crank shafts here are connected with the piston through toggle linkage comprising a pair of connecting rods 5 and 5 of equal length, pivotally mounted at their upper ends on a wrist pin 6 in the piston 2. At their lower ends, these rods are pivotally connected by means designated at 30, each with a toggle linkage comprising links 16 and 17. The links 16 of both toggles are pivotally mounted on a fixed pivot shaft or support 18 that is disposed in the axial plane of the cylinder and piston, parallel with the crank shafts and somewhat above the horizontal plane of the crank shafts. The two links of each toggle set have their inner ends pivotally connected together by the pivot pin 30 which joins the toggle with the corresponding connecting rod 5. The links 17 are pivotally mounted at their outer ends on the journals 3x of the arms 9 of the corresponding crank shafts 3.

It is to be understood that the toggle linkage is so designed that with the connections shown, each crank shaft 3 may rotate as intended and the links 16 and 17 of a toggle never will come into longitudinal alinement during rotation, but will operate within an angle that reaches its maximum degree of approximately 155° when the piston is at its lower limit of travel, as illustrated in Fig. 2, and reaches its minimum degree of approximately 40° when at the top of its stroke as illustrated in Fig. 3.

The arms or throws 9—9 of the crank shafts 3 and 3 are of equal length, as are also the connection rods 5 and 5. Likewise, corresponding links of the two toggles are of the same length. The arrangement is such that, in the power stroke of the piston, equal forces are applied to the crank shafts, and the angles of the rods or links 5 and 5 relative to the axis of the cylinder always remains equal. Therefore there will be no unbalanced application of lateral forces against the piston by these rods, and consequently no undue wear on the cylinder or piston walls will result.

In the modified construction, which has been illustrated in Figs. 7, 8 and 9, 1 designates the engine cylinder, 2 a piston that is reciprocally operable in the cylinder, and 3a and 3a designate crank shafts mounted in the engine crankcase or housing 4a in parallel relationship and symmetrically located at opposite side of the axial line of the cylinder and somewhat below the limit of travel of the piston. The crank shafts are connected, respectively, by rods 5a and 5a with the piston; the connection here being effected through means of a wrist pin 6a, common to both rods, that is carried in a centrally depending bracket 8 formed as a part of the piston body or fixed rigidly thereto.

The links 5a and 5a together constitute a toggle linkage, and these rods are of equal length and it is significant that both rods are mounted on the wrist pin 6a and that the wrist pin is perpendicular to and passes directly through the axial line of the cylinder and is parallel with the crank shafts. The arms or throws 9a and 9a of the crank shafts 3a and 3a, are of equal length, as are also the connecting rods. The arrangement is such that, in the downward power stroke of the piston, equal forces are applied to the crank shafts, and the angles of the rods 5a and 5a relative to the axis of the cylinder always remains equal and the rods never reach a position of parallel alinement. Therefore, there will be no unbalanced application of forces in the engine operation against the piston, and consequently no undue wear on the cylinder or piston walls will result from the connection.

In order that the pair of crank shafts 3 and 3 of the engine of Fig. 1, or the shafts 3a and 3a of the engine of Fig. 7 may operate in unison, they are equipped, in each instance, respectively, with gear wheels 10 and 10a of like diameter, which gears operate in mesh with each other. Thus the crank shafts will rotate in unison and in opposite directions, and the setting of the gears is such that the crank arms will move across the top center of their arcs of travel at exactly the same time and outwardly from each other. One or the other of the crank shafts may be used as a power take off shaft, or both may be geared to a drive shaft to be used as a power take-off.

It is important in order to obtain the desired results from the use of the present type of engine, as above described, that rotation of the crank shafts should be away from each other across the top of the arcs of rotation. In other words, the right-hand crank shaft as shown in Fig. 1 or in Fig. 7, must rotate clockwise while the left-hand crankshaft must rotate counterclockwise. This result is insured by reason of the geared connection and through proper timing of the power impulses relative to the position of the crank shafts. In the ordinary type of internal combustion engine, the fuel charge is ignited substantially at the time the piston reaches the top of its compression stroke. In this case, since it is desirable that the crank rotate in the direction indicated by the arrows in Fig. 1, the ignition spark is discharged in proper timing with respect to piston travel, to accomplish this result. I have not herein shown valves or their actuating means for timing the admission and discharge of fuel charges, but it is understood they may be of conventional design.

The engine which I have illustrated in Fig. 4 embodied the principle of that of Fig. 1, but in a modified construction. In this illustration, a piston 2 is reciprocally contained in an engine cylinder 1 and the crankshaft 3x is mounted in the crank shaft housing 15 offset from the axial line of the cylinder. The throw 9x of the crank shaft is operatively connected with a toggle linkage comprising the links 16' and 17' of substantially or equal length with the link 17' pivotally mounted on a fixed pivot 18' that is mounted in the crank shaft housing at the side of the axial line of the cylinder opposite that at which the crank shaft 3x is mounted. The two links of the toggle are pivotally connected together at their inner ends by a pivot pin 30', and a connecting rod 31 operatively joins the piston 2 with the toggle. The rod 31, as noted, is mounted pivotally at its lower end on pin 30' and at its upper end is mounted on the piston by a wrist pin 32.

The toggle linkage, as seen in Fig. 4, is so arranged that incident to reciprocation of the piston and rotation of the shaft 3x, the pivot axis 30' will oscillate along an arc centered in the pivot 18' and extending substantially vertically and which arc crosses only slightly from one side to the other of the axial line of the cylinder, as will be understood by reference to the dotted line 35 in Fig. 4.

In Fig. 7, I have diagrammatically indicated an ignition circuit suitable for any of the engines shown. This includes the spark plug 20 mounted in the upper end wall of the cylinder, and connected by circuit wire 21 with a source of electrical energy 22. Another wire, 23, connects the source 22 with a switch contact 24 and the switch includes also a yieldably movable contact 25 designed to be moved against contact 24 by a cam 26 on the shaft 3a, thus to close the circuit to ignite the fuel charge at the proper time to cause the direction of rotation indicated.

Assuming that in operation of the engine of Fig. 1, the parts have reached the position in which they are shown in Fig. 3 at the time the explosion takes place in the explosion chamber of the cylinder, it is apparent that the resultant downward action of the piston will drive the crank shaft arms 9 and 9 outwardly, as indicated by the direction arrows. The application of power to these crank arms by the toggles becomes relatively more effective with rotation of the crank shafts due to the increase of leverage resulting from the increasing angle of the toggle linkage and leverage as applied by the connecting rods to the toggle linkage.

This relative increase in application of power, due to the angle of toggle linkage, continues until the piston reaches its downward limit of travel and the driving force of the exploding charge is either fully expended or is released by the opening of the exhaust valve of the engine, not here shown. Continued rotation of the crank shafts then actuates the piston back to its starting position.

In the operation of the engine as modified in Fig. 4, the exploding of a charge in the combustion chamber drives the piston downwardly from the position in Fig. 4 to the position indicated in Fig. 6. During the initial downward movement, the angle of the toggle linkage is increasing and the arm $9x$ of the crankshaft $3x$ is rotating across the top of the arc of travel in a counterclockwise direction. After passing through the position indicated in Fig. 5, the toggle linkage approaches nearer to a straight line between the mounting end pivots and therefore becomes more effective, and as the parts pass through the position indicated in Fig. 6, the piston then is moved on its upward stroke for the exhaustion of the exploded fuel charge or for the compression of a fresh charge in the cylinder.

In all of the constructions illustrated, the toggle linkage operates to build up or maintain power as applied to the crank shaft while the force of the exploding charge in the cylinder is diminishing. Thus, contrary to the usual results in internal combustion engines, driving force is increased or maintained throughout the full power stroke of the piston. Furthermore, in the device of Fig. 4, the application of counteracting forces against the piston is approximately in the axial line of travel of the piston and therefore wear on the cylinder walls and piston walls due to lateral thrust is reduced to a minimum.

While I have illustrated the present mechanism in connection with internal combustion engines, it is to be understood that the toggle linkage and connection is applicable to any type of engine where a reciprocating, driven element is to be connected with a shaft in a manner whereby the reciprocatory motion is translated into rotary motion. The designs here shown may be varied or modified within reason, without materially effecting the results. However, the present showing is thought to be the most practical for present-day uses and present-day types of engines.

The advantages to be gained are found in fuel saving, less wear, less vibration and a steadier and more constant application of forces to the drive shafts.

Having thus described my invention, what I claim as new therein and desire to secure by Letters Patent is:

In an engine, a power cylinder, a piston reciprocally operable therein, a pair of crank shafts symmetrically spaced at opposite sides of the axial line of the cylinder and beyond one end thereof, a fixed pivot member in the axial line of the piston travel and closely approaching alinement between the crank shafts, a toggle for each crank shaft; each toggle comprising two links with inner ends pivotally connected and with outer ends mounted respectively on the crank shaft and on the fixed pivot member, and a connecting rod for each toggle; each rod having one end fixed pivotally in the piston, and its other end pivotally connected with the corresponding toggle at the point of connection of the links of the toggle.

CHARLES A. HOLMAN.